US005620326A

United States Patent [19]
Younker

[11] Patent Number: 5,620,326
[45] Date of Patent: Apr. 15, 1997

[54] ANATOMICAL SIMULATOR FOR VIDEOENDOSCOPIC SURGICAL TRAINING

[75] Inventor: Scott B. Younker, Vashon Island, Wash.

[73] Assignee: Simulab Corporation, Vashon Island, Wash.

[21] Appl. No.: 489,311

[22] Filed: Jun. 9, 1995

[51] Int. Cl.⁶ .................................................. G09B 23/30
[52] U.S. Cl. ........................................ 434/268; 434/272
[58] Field of Search .................................... 434/262, 265, 434/272, 267, 268

[56] References Cited

U.S. PATENT DOCUMENTS

| | | | |
|---|---|---|---|
| 2,689,415 | 9/1954 | Haver | 434/272 |
| 4,459,113 | 7/1984 | Gatti et al. | 434/272 |
| 4,481,001 | 11/1984 | Graham et al. | 434/267 |
| 4,789,340 | 12/1988 | Zikria | 434/272 |
| 5,137,458 | 8/1992 | Ungs et al. | 434/265 |
| 5,149,270 | 9/1992 | McKeown | 434/267 |
| 5,215,469 | 6/1993 | Kohnke et al. | 434/272 |
| 5,425,644 | 6/1995 | Szinicz | 434/267 |
| 5,518,406 | 5/1996 | Waters | 434/267 |
| 5,518,407 | 5/1996 | Greenfield et al. | 434/267 |

OTHER PUBLICATIONS

Catalog, Everest Medical Corporation, Minneapolis, MN, Sep. 1994.
Catalog, Advanced Surgical, Inc., Princeton, NJ.

*Primary Examiner*—Paul J. Hirsch
*Attorney, Agent, or Firm*—Christensen O'Connor Johnson & Kindness PLLC

[57] ABSTRACT

An anatomical simulator system (10) includes a synthetic anatomical torso (12) resting on a base (14). The torso includes an internal cavity (18) and a pneumoperitoneum wall (16). A selected one of a variety of procedure packs (20, 30) is placed inside the cavity for use in training in videoendoscopic surgical techniques. The torso includes a plurality of trocar apertures (22) which permit insertion of videoendoscopic instruments for manipulation, incision, dissection and suturing of synthetic anatomic structure included in the procedure packs. Each procedure pack includes simulated anatomic structures (34,36,38,40) that have a realistic appearance and density, that provide realistic tactile feedback during manipulation and incision, and that are suturable and/or electrocauterizable using endoscopic instruments. The anatomic structures included within the procedure packs are joined together with synthetic connective tissue that is severable to allow dissection of structures without damaging the underlying structures. Pressurized vessels (36) containing synthetic bodily fluids are included to simulate dissectable blood vessels, bile ducts and the like.

43 Claims, 7 Drawing Sheets

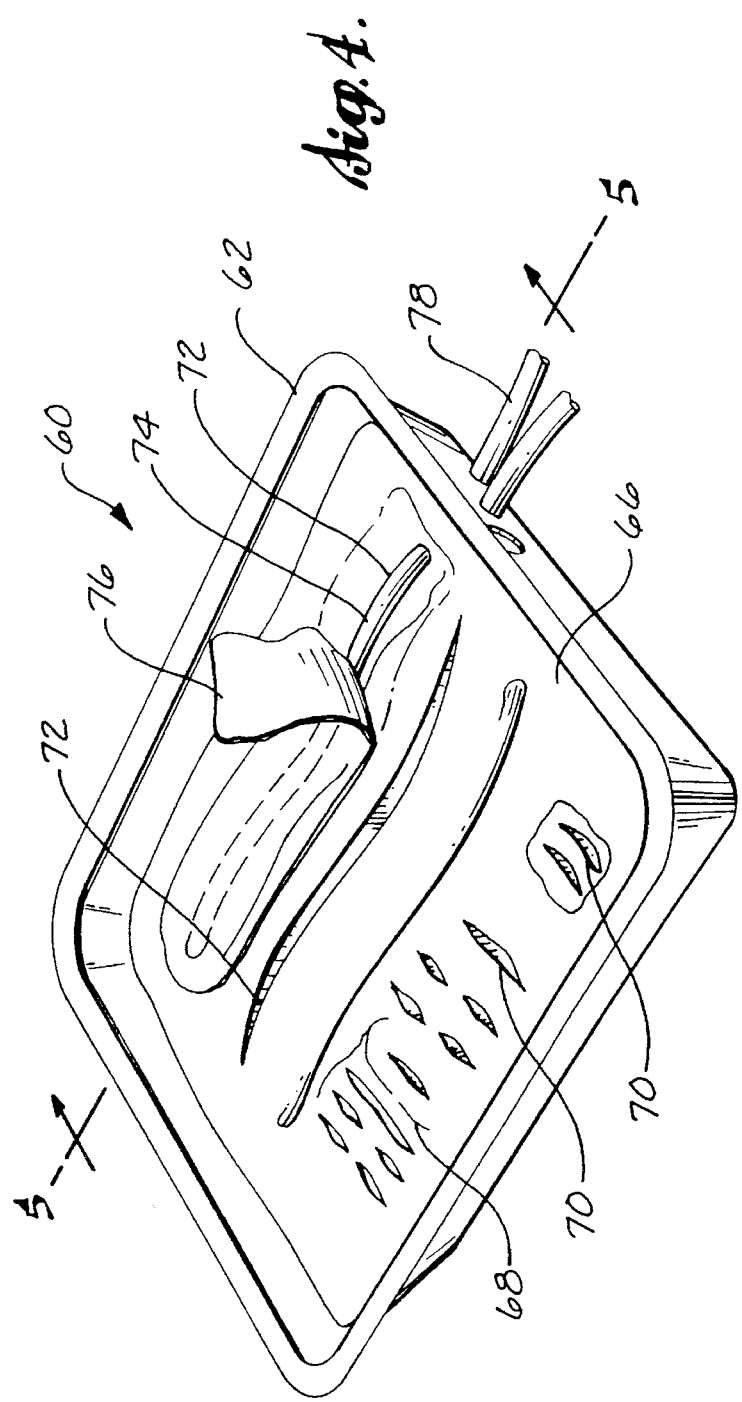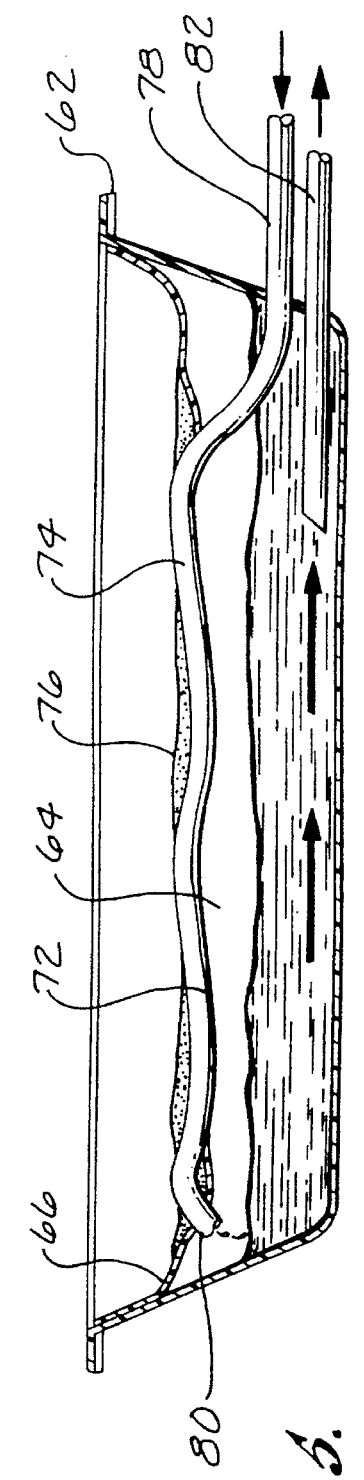

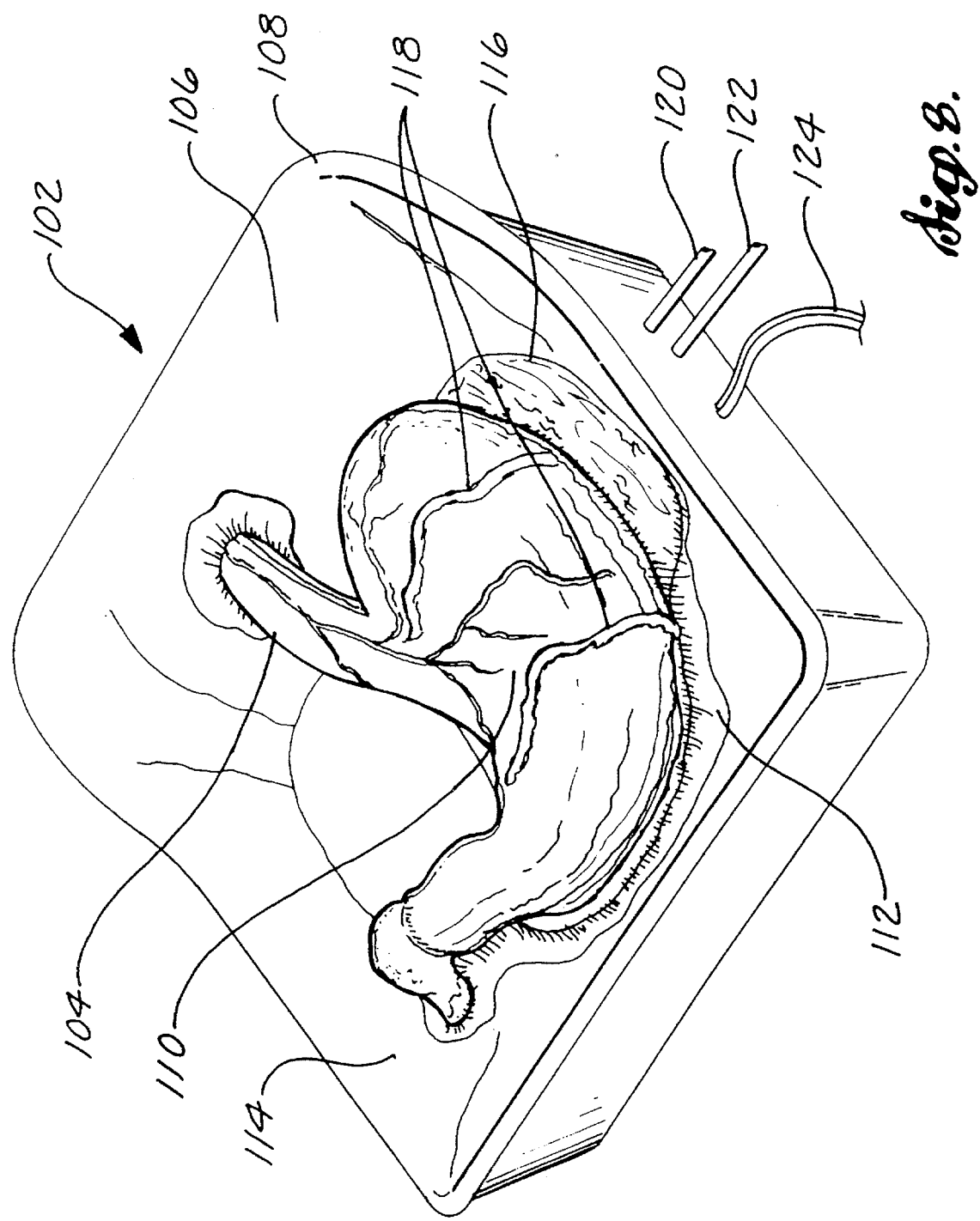

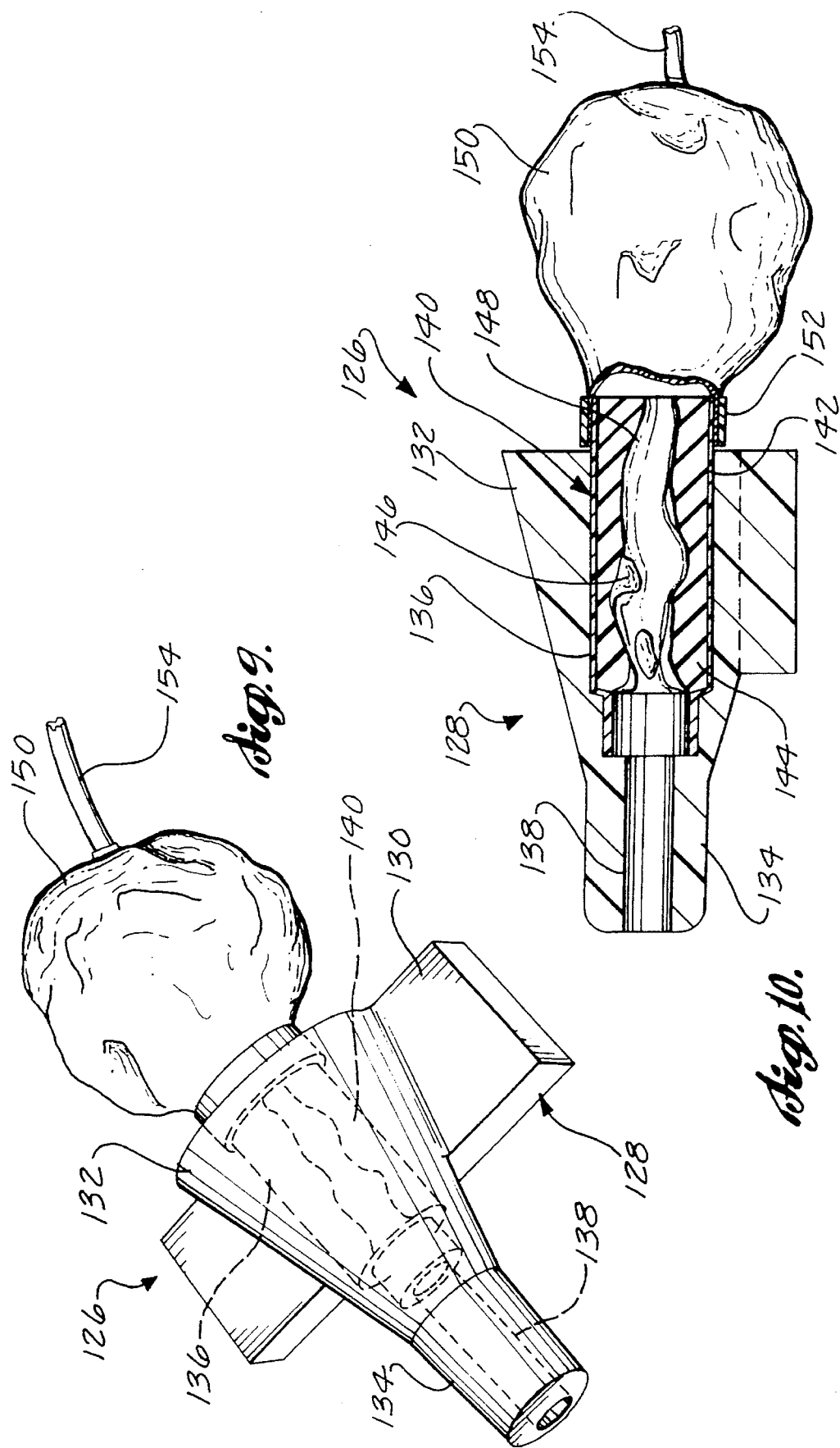

ANATOMICAL SIMULATOR FOR VIDEOENDOSCOPIC SURGICAL TRAINING

FIELD OF THE INVENTION

The present invention relates to surgical training, and particularly to simulated anatomical structure for use in teaching videoendoscopic surgical techniques.

BACKGROUND OF THE INVENTION

In recent years many invasive surgical and operative medical procedures have been developed utilizing videoendoscopic techniques. Videoendoscopy reduces the trauma and recuperative periods associated with prior conventional surgical techniques. Videoendoscopic procedures have been developed for a wide variety of gynecological, chest, abdomen and urologic procedures, to place feeding tubes into the digestive tract, to take biopsies, to inspect for tumors, and to correct some types of infertility, by way of example. Additional techniques may be developed including endoscopic techniques for sinus surgery, esophagus repair, fetal surgery and prophylactic breast cancer surgery. Videoendoscopy entails inserting instruments through a small incision into an operative cavity. A narrow video camera is also inserted to guide the surgeon in manipulation of the endoscopic instruments.

For example, operations which take place in the abdomen are carried out by inserting trocar stops through the abdominal wall and peritoneum. A trocar supplied with air or an inert gas is inserted into the trocar stop, and gas flow is commenced to inflate the peritoneum. Video cameras and instruments are then inserted through the trocars to carry out the operation. Unlike prior conventional techniques, the surgeon is not able to rely on his or her sense of feel and direct tactile response during endoscopic surgery. Further, visual response is limited to that viewed through the endoscopic video output, in which many structures may look similar. It is thus critical that surgeons are taught and maintain videoendoscopic skills that help them to identify structure and to carefully control the endoscopic instruments to ensure that a surgical procedure is accurately performed without causing unnecessary damage to surrounding tissue.

Many endoscopic surgeries require incision and dissection of tissue using electrocauterization. The endoscopic electrocautery scalpel serves as the cathode. The anode, or return electrode, is placed under the patient's back prior to surgery to complete the electrical circuit, and the scalpel is then used to cut and cauterize the tissue. Electrocauterization via endoscopy is a technique that also requires great skill and precision.

Conventional techniques for teaching endoscopic surgery procedures involve the use of animal specimens. The use of laboratory animals for surgical training is very expensive and is sometimes also subject to popular debate. Additionally, animal specimens have a short viability on the operating table, and thus provide the trainee with a limited period of time in which to practice repeated techniques.

As an alternative to conducting animal studies, a surgical training device referred to as a pelvic trainer has been developed that consists of a tray containing rigid synthetic organs. The tray is covered with a clear latex sheet through which endoscopic instruments are poked. While this device presents some opportunity to view the simulated organs relative to the operative instruments, these rigid plastic organs are not suitable for manipulation and dissection, and thus do not provide realistic training.

Other endoscopic training systems that are being developed involve virtual reality systems using robotics to mimic the mechanical feedback experienced by surgeons during endoscopic training. These systems are highly complex and expensive, and the reliability, accuracy and degree of realism provided by such systems has not yet been established.

There thus exists a need for systems and methods to train medical students and surgeons in endoscopic techniques that provide low cost realistic opportunities to practice videoendoscopic manipulation, incision and surgical procedures. In order to make this training most effective, trainees should be provided with realistic visual and tactile feedback during training.

SUMMARY OF THE INVENTION

The present invention provides an anatomical simulator for surgical training. The anatomical simulator includes a plurality of synthetic anatomical structures that are bonded together by a flexible synthetic connective tissue. The connective tissue is severable to permit dissection of the anatomical structures while maintaining the integrity of individual dissected anatomical structures.

In a further aspect of the present invention, the anatomical structures of the simulator are formed from an electrically conductive elastomer that is electrocauterizable. The anatomical simulator includes an electrode lead secured in electrical contact with the anatomical structure to serve as the anode during electrocauterization of the synthetic anatomical structure.

To render the surgical simulator more realistic, the synthetic anatomical structure may include one or more vessels having a resilient wall. The vessels include a synthetic bodily fluid that is pressurized so that it exudes from a vessel if the vessel wall is cut during surgical training. Fluid is preferably supplied to the vessel from a fluid reservoir by a pump to provide for a continuous flow of fluid for a finite period of time, thus enabling the mimicking of blood flow from an incised blood vessel during surgery training.

The anatomical simulator of the present invention is well suited for videoendoscopic surgical training utilizing hand-held endoscopic instruments to teach a surgical procedure intended for use in treating humans or other mammals. The synthetic anatomical structure preferably is formed from a resilient elastomeric material that is selected to have a density equivalent to that of the corresponding mammalian anatomical structure, and to provide tactile feedback through hand-held endoscopic instruments during the surgical procedure equivalent to that experienced during performance of a surgical procedure on the corresponding mammalian anatomical structure. In this way a surgical trainee is provided with realistic tactile feedback as the anatomical structure is manipulated, incised and dissected.

The present invention also provides an anatomical torso simulator for videoendoscopic training using hand-held endoscopic instruments insertable through trocars. The torso includes a base including a pneumoperitoneum wall defining a plurality of apertures formed in an array. Each aperture is sized to receive a trocar. An annular elastomeric mount is included in the pneumoperitoneum to permit a trocar inserted within the aperture to be tilted in all directions by 45° relative to a longitudinal axis defined by the trocar when the trocar is at rest within the aperture. The elastomeric mounts have a predetermined diameter and thickness such that the force required to tilt each trocar is equivalent to the force required to deflect a trocar inserted within an actual patient's inflated peritoneal cavity.

The present invention also provides an anatomical simulator system for videoendoscopic training including the synthetic torso and a plurality of differing procedure packs. Each procedure pack includes synthetic anatomical structure that is to be endoscopically manipulated, incised or dissected during a corresponding videoendoscopic procedure.

The present invention also provides an elastomeric composition for use in forming an anatomical simulator for surgical training. The elastomeric composition includes a liquid elastomer base such as water based latex that is curable to form a desired elastomer. A gelling agent such as carboxymethyl cellulose is admixed with the liquid elastomer base in a quantity sufficient to reduce the tear strength and maximum elongation of the cured resilient elastomer by at least 50%, and preferably by at least 75%, to mimic the elongation and tear strength of anatomical connective tissue that joins mammalian anatomical structures.

The present invention provides anatomical simulators that include realistic organs and other anatomical structures that have the appearance, density, manipulative feel, suturability, electrocauterizability and tactile feedback of actual human and other mammalian organs that would be experienced by a surgeon performing videoendoscopic surgery. These synthetic anatomical structures are joined together with synthetic connective tissue that is readily severable by cutting or electrocauterization to allow dissection of anatomical structure without destroying the integrity of the anatomical structure. The anatomical simulators also include pressurized vessels that allow simulation of blood vessels and bile ducts, for example. Differing anatomical simulator packs, each corresponding to a specific operative procedure to be taught, can be constructed in accordance with the present invention. These anatomical simulator packs are selected and placed within the torso of the present invention to enable surgeons to videoendoscopically practice the surgical or other operative technique. Routine skills such as videoendoscopic suturing, knot tying, electrocauterization, dissection, clamping and intubation can be repeatedly practiced by trainees on low cost disposable surgical simulators. The present invention thus provides an opportunity for training to develop realistic videoendoscopic surgical skills.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 4 provides a pictorial view of an anatomical suture simulator constructed in accordance with the present invention, and showing connective tissue covering a synthetic blood vessel being peeled back;

FIG. 5 provides a cross sectional view of the suture simulator of FIG. 4 taken substantially along the line 5—5;

FIG. 8 provides a pictorial view of an upper gastrointestinal procedure pack including a simulated stomach, esophagus and spleen;

FIG. 9 provides a pictorial view of a urinary procedure pack including a synthetic prostrate gland and bladder; and FIG. 10 provides a cross sectional view of the simulator of FIG. 9 taken along the longitudinal axis of the penile and prostate gland simulator.

DETAILED DESCRIPTION OF THE PREFERRED EMBODIMENT

Figure 1:
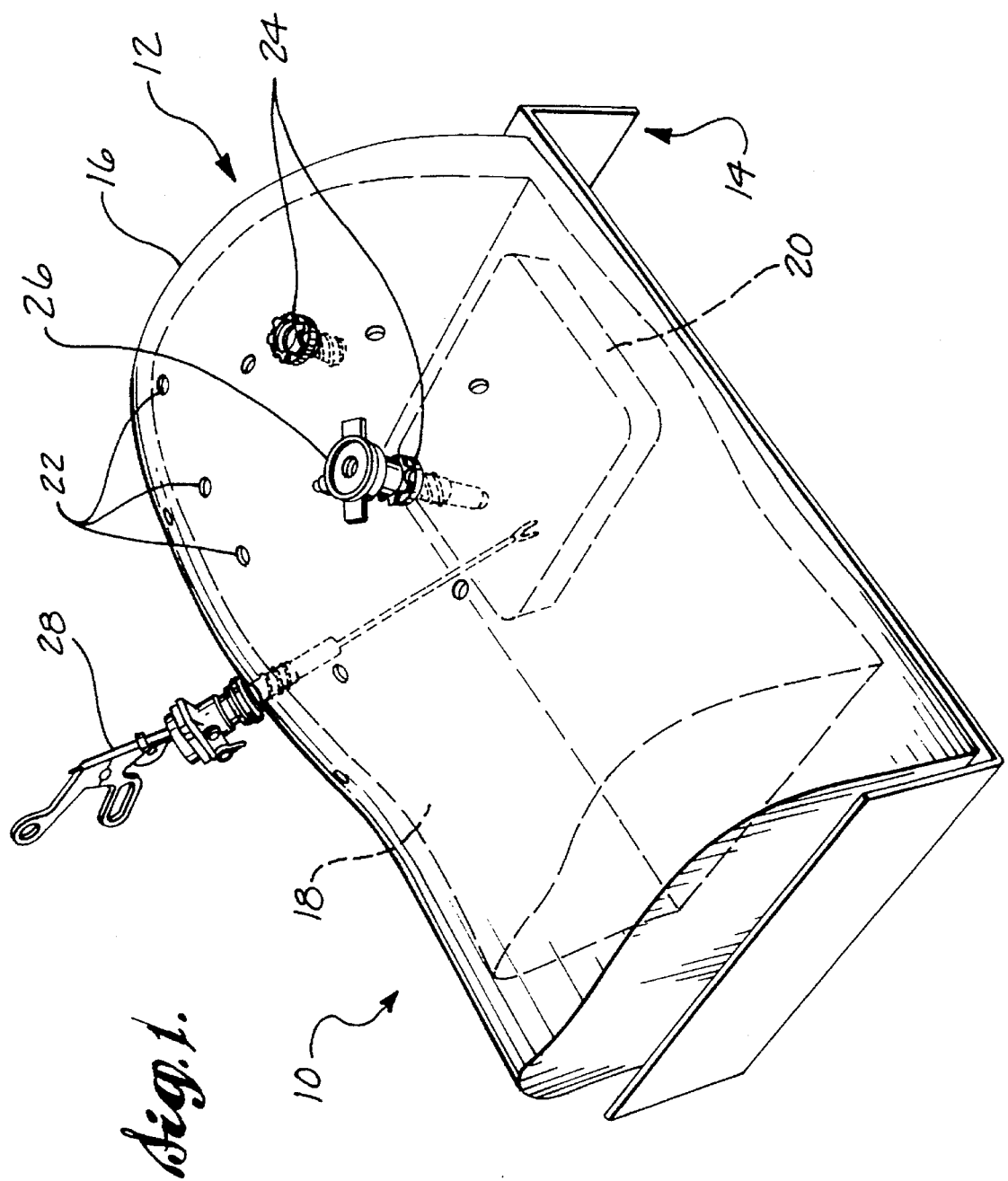
FIG. 1 provides a pictorial view of an anatomical simulator system constructed in accordance with the present invention including a torso housing an anatomical simulator procedure pack.

An anatomical simulator system 10 constructed in accordance with the present invention is shown in FIG. 1. The system 10 includes a synthetic torso 12 resting on a base 14. The torso 12 is generally semi-cylindrically shaped, and includes a pneumoperitoneum wall 16 that defines an internal cavity 18. A procedure pack 20 including synthetic anatomic structure is supported on the base 14 within the cavity 18. The pneumoperitoneum wall 16 defines a plurality of trocar apertures 22 arranged at spaced intervals about the upper surface and sides of the peritoneum wall 16. Each trocar aperture 22 is sized to receive a standard trocar stop 24 into which trocars 26 may be inserted. Endoscopic instruments 28 can be inserted through the trocars 26 into the interior cavity 18 for manipulation, incisions and dissection of the anatomic structure formed in the procedure pack 20.

Figure 2:
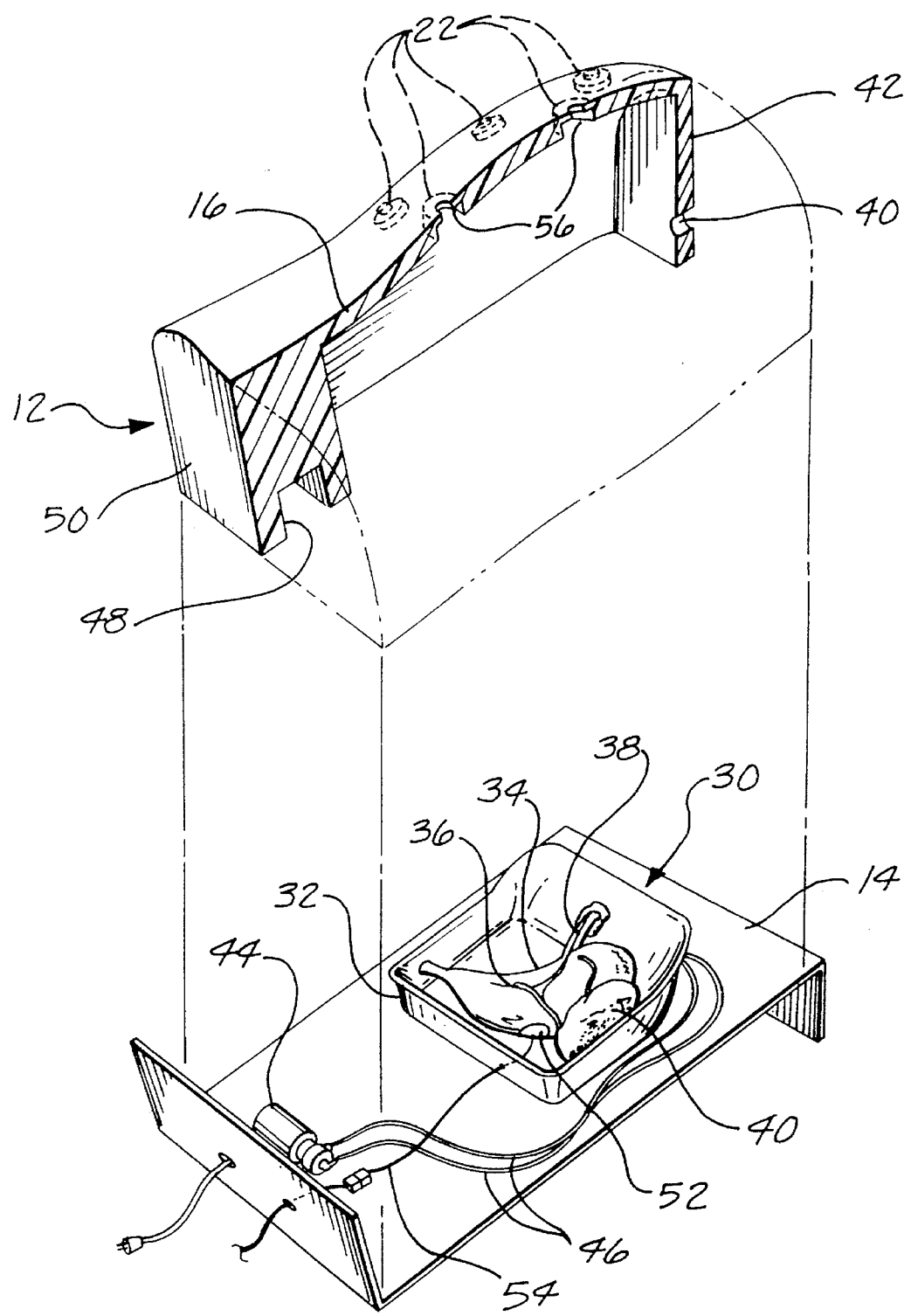
FIG. 2 provides an exploded view of the simulated torso, base and procedure pack of FIG. 1, with the torso shown in cross section taken along the longitudinal axis of the torso.

Referring to FIG. 2, a representative procedure pack 20 is shown as a upper gastro-intestinal procedure pack 30. The procedure pack 30 is contained within a tray 32 and contains a synthetic stomach 34 including synthetic gastric arteries 36, synthetic esophagus 38 a synthetic spleen 40. The esophagus 38 projects from the tray 32 and can be accessed through a port 40 formed in a rear wall 42 of the torso 12. This enables an insertion of a bougie (not shown) into the esophagus 38 during training.

The arteries 36 are pressurized with a synthetic blood fluid that is recycled from a reservoir (not shown) formed in the tray 32 by a pump 44 connected to the reservoir and arteries 36 via fluid lines 46. The use of a pump to pressurize vessels within the procedure pack 20 shall be described further subsequently. The pump 44 is mounted on the base 14 within a recess 48 formed in the forward wall 50 of the torso 12.

The procedure pack 20 also includes an electrode 52 mounted in electrical contact on the stomach 34 that is connected to a lead 54 that passes from the tray 32 for use in electrocauterization training, as shall be described subsequently.

A. Torso Simulator

Figure 3:
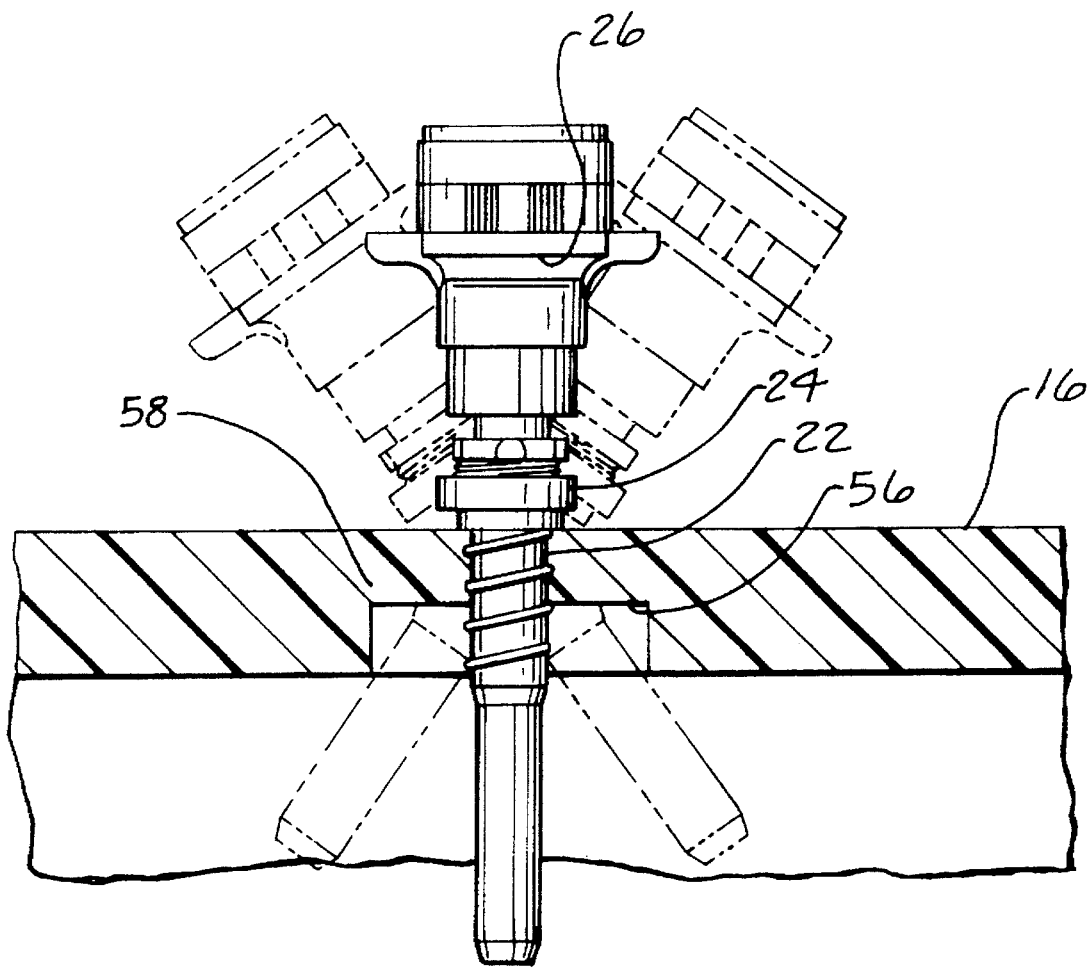
FIG. 3 provides a cross sectional view of a trocar aperture of the torso of FIG. 1 in which a trocar has been mounted within a trocar stop, and showing in broken line the pivotal range of movement of the trocar.

Attention is now directed to FIGS. 1–3 to further describe the torso 12. The torso is formed from a flexible elastomeric material. Suitable materials include two-part urethane foams that are self-skinning upon cure and silicone. Other suitable materials include silicon rubber and urethanes. The torso 12 is contoured to match the general contour of a human torso when the peritoneum has been inflated with air or other gas during endoscopic surgery. The peritoneum wall 16 has a thickness that is a predetermined thickness to simulate the rigidity of a chest cavity and inflated peritoneum. The apertures 22 are arranged in an array and placed at locations useful for performing a variety of endoscopic surgical procedures. In the preferred embodiment, a total of 14 trocar apertures 22 are provided (not all shown), however, it should be readily apparent to those of ordinary skill in the art that this number could be increased or decreased as desired.

Referring to FIGS. 2 and 3, each trocar aperture 22 has a generally cylindrical configuration. A cylindrical recess 56 is formed around each aperture 22 in the interior surface of the pneumoperitoneum wall 16. The purpose of the recesses 56 is to define a thin annular elastomeric mounting portion 58 surrounding each trocar aperture 22. The mounting portion 58 has an axial thickness and diameter that are predetermined to enable realistic movement of inserted trocars 26 and instruments inserted there through, to mimic the movement and feel of trocars and instruments inserted into actual human peritoneum cavities. Without the recess 56, the thickness of the peritoneum wall 16 would be overly thick around the trocar apertures 22, giving a "stiff" feel to the action of the trocars. The mounting portions 58 of the present invention flex during this pivotal movement of the trocars. The dimensions of the mounting portion 58 are determined such that the trocar 26 and trocar stop 24 can pivot about the point of insertion through the aperture 22 in all directions by approximately 45°, as shown in broken line in FIG. 3, upon the exertion of manual force equivalent to that required to deflect a trocar the same extent in an actual human peritoneum. The angular deflection of the trocar 26 is measure relative to its resting longitudinal axis within the aperture 22.

While a smoothly contoured torso 12 has been illustrated in FIGS. 1 and 2, it is preferred that the torso 12 be contoured both internally and externally to more closely match the structure and shape of a human torso. Thus, it is preferred that the interior surface of the peritoneum wall 16 be contoured to match the interior of the chest and abdominal cavity, and that the upper surface of the base 14 likewise be contoured to match the posterior internal surface of the chest and abdominal cavity.

B. Simulator Procedure Packs

The anatomical simulator system 10 of the present invention accommodates a broad variety of procedure packs 20, each of which includes a specific simulated anatomic structure to enable practice of particular operative skills. Each of these procedure packs 20 includes one or more traits in common. The procedure packs 20 are designed to provide anatomic structure that has a realistic appearance when viewed through an endoscopic video camera. The anatomical structures include synthetic tissue that has a density, resiliency and flexibility that approximate that of the corresponding mammalian anatomic tissue, and that reacts to mechanical forces in an equivalent fashion. Thus, the synthetic anatomic structure used in the procedure packs 20 of the present invention provides tactile feedback through endoscopic instruments during manipulation, suturing, incision and dissecting equivalent to that which would be felt through endoscopic instruments during the same operations performed on corresponding mammalian anatomic structures.

Additionally, depending on the intended function of the particular procedure pack 20, the anatomic structure is made from material compositions that can be cut with a laser and/or that is electrocauterizable. Several illustrative procedure packs 20 shall now be described. Each of these procedure packs has one or more of the features common to other procedure packs of the present invention.

Attention is first directed to FIGS. 4 and 5 for a description of the illustrated suture procedure pack 60. The suture procedure pack 60 includes a rectangular tray 62 defining an internal reservoir 64. The procedure pack 60 includes a thin contoured latex rubber sheet 66 that is laid within the tray 62 and sealed around its edges to the lip of the tray 62. The sheet 66 is suspended above the bottom of the tray 62, thus leaving the interior reservoir 64 unfilled. The latex sheet 66 is formed with a variety of contoured ridges 68, grooves 70 and channels 72. These grooves, ridges and channels are formed to simulate various incisions and features in human tissue that require suturing. The latex rubber used in forming the sheet 66 is a natural water-based latex that is thinned with additional water, as will be described subsequently, and formed into a sheet of predetermined thickness to provide material characteristics that may be sutured using an endoscopic suturing instrument with the same degree of care as required to suture actual tissue. The material has a strength that is suitable for suturing yet will "stick" to the suture needle of endoscopic reciprocating suturing instruments such as the ENDO STITCH device manufactured by U.S. Surgical Inc., if suturing is done improperly. A trainee may use the suture training pack 60 within the torso 12 for as long as is desired to perfect suturing and knot tying skills.

The suture training pack 60 also includes structure that enables practice in the dissection, clamping and suturing of arteries and veins. Referring still to FIGS. 4 and 5, a flexible latex tube 74 is placed within one of the elongate troughs 72 formed in the upper surface of the latex sheet 66. The tube 74 is formed from a flexible latex material that will be described subsequently that has a flexibility and thickness that mimics the material properties of a human blood vessel. The tube 74 is sealed into the channel 72 by a thin layer of synthetic connective tissue 76 formulated in accordance with the present invention. The connective tissue 76 shall be described in further detail subsequently. It is critical to the effectiveness of many features of the procedure packs of the present invention. The connective tissue is a flexible, resilient, low-tear strength, low maximum elongation material that bonds anatomic structures together that is readily incised and severable using medical instruments to allow separation of joined anatomic structure without destroying the integrity of the individual anatomic structures. Thus, a trainee can use an endoscopic scalpel to cut the connective tissue 76, and can then grasp the tube 74 and pull it free of the latex sheet 66 to simulate dissection of a blood vessel. The vessel can then be clamped and sutured as is required for training purposes.

To more accurately simulate dissection of a blood vessel, the suture procedure pack includes pressurized flow of simulated blood fluid through the tube 74. The tube 74 has an inlet end 78 that is connected to a fluid line 46 of the pump 44 previously described with reference to FIG. 2. The pump 44 supplies a continuous flow of simulated blood fluid, such as thickened and dyed water, to the inlet end 78 of the tube 74. The opposite end of the tube 74 is sealed except for a small port 80 that serves as an orifice valve that permits a restricted flow of fluid from the tube 74. This end of the tube 74 projects through the latex sheet 66 so that fluid flowing from the outlet port 80 flows into the reservoir 64 of the tray 62. From there it is withdrawn through an outlet line 82 for return to the pump 44, where it is then recirculated back to the tube 74. The outlet orifice 80 is of a size predetermined to allow a low flow rate of fluid through the tube 74. However, if the tube 74 is accidentally or purposely cut during training, additional fluid will flow from the tube 74 through the cut thus formed, increasing the total rate of flow through the vessel 74 until the cut is either sutured or clamped. Thus, a student is exposed to realistic blood flow and may practice controlling such flow.

As an alternative to the suture simulator procedure pack disclosed in FIGS. 4 and 5 utilizing a flexible latex sheet over the top of a liquid filled reservoir, it is also possible to instead configure the suture simulator procedure pack with a thicker layer of elastomeric simulated tissue that fills the complete bottom of the tray 62. For example, a dry solid suture procedure pack having the same outer contour as that illustrated in FIG. 4 can be formed from elastomeric material when it is not desired to include a liquid reservoir for simulated blood flow in suture training.

A suitable elastomeric formula for making such a dry suture training procedure pack is a two part expandable urethane foam. One suitable urethane foam is available from BJB Company, Garden Grove, Calif., part number TC 281. It is preferable to mix in agents that affect the foaming and skin formation of the urethane to provide a contoured foam layer that has a thin outer skin and large air cells, providing a low density, highly flexible foam. Preferably quantities of water and an oil or grease, such as petroleum jelly, are added to the formulation to yield a reduced exterior skin thickness and increased air cell size. Most preferably the urethane is admixed with water in a ratio of one part water to sixteen parts urethane by weight (i.e., 6% water by weight). Additionally petroleum jelly is added to the urethane formulation in a ratio of one part petroleum jelly to sixteen pans urethane by weight (i.e., 6% by weight). A suitable pigment is also added to provide a realistic color to the urethane formulation to mimic human tissue. A preferred way of mixing this formulation is to add the water and petroleum jelly to Part A of the urethane system, prior to mixing Part A with Part B to yield the liquid expanding foam that is then molded to form the simulated tissue mass. In addition to affecting the formation of exterior skin and air cell size, the addition of petroleum jelly is believed to aid in the suture needle passing through the elastomer during training use to more realistically mimic suturing of tissue.

The solid elastomeric film member that is sealed within the tissue tray 62 can be molded to have contoured fissures and ridges for suturing on both sides of the layer, so that after a first side has been sutured the layer can be flipped over to provide a second contoured surface for suturing. A flexible length of tubing such as the tube 72 illustrated in FIG. 4 can also be sealed into a channel formed in this contoured foam member using simulated connective tissue 76, much as previously described for the suture simulator procedure pack 60. However this flexible tube would be filled with a static quantity of fluid rather than being connected to a pump and fluid reservoir for continuous fluid flow.

Figure 6:
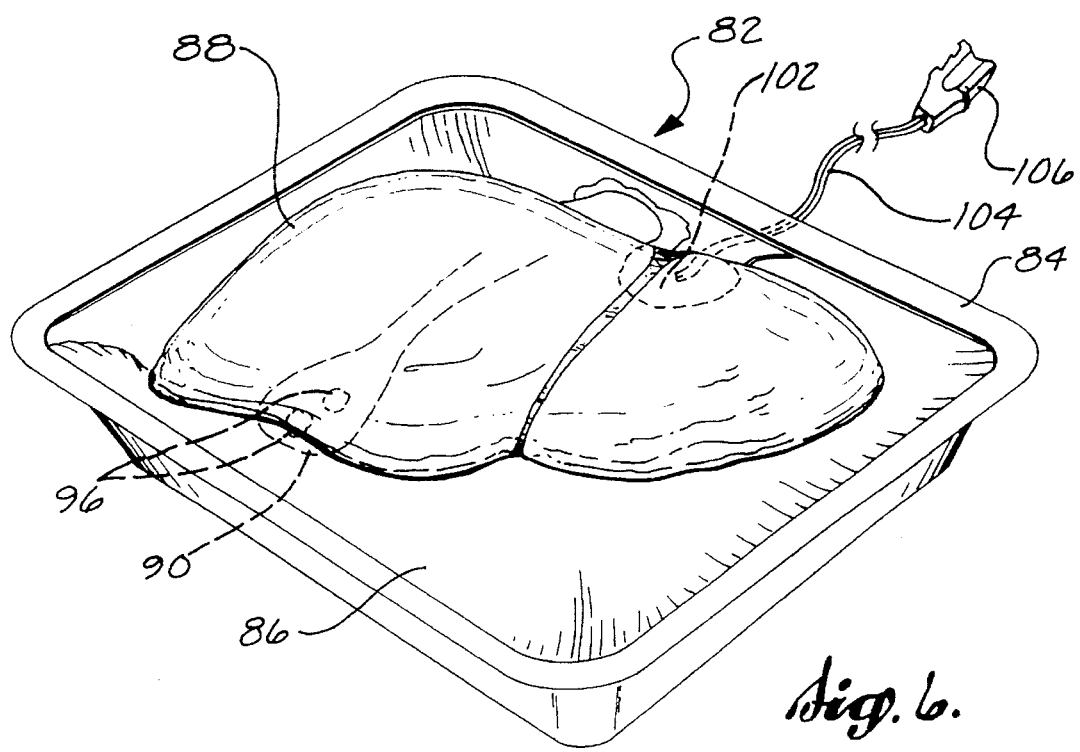
FIG. 6 provides a pictorial view of a laparoscopic cholecystectomy procedure pack including a simulated liver and gall bladder.
Figure 7:
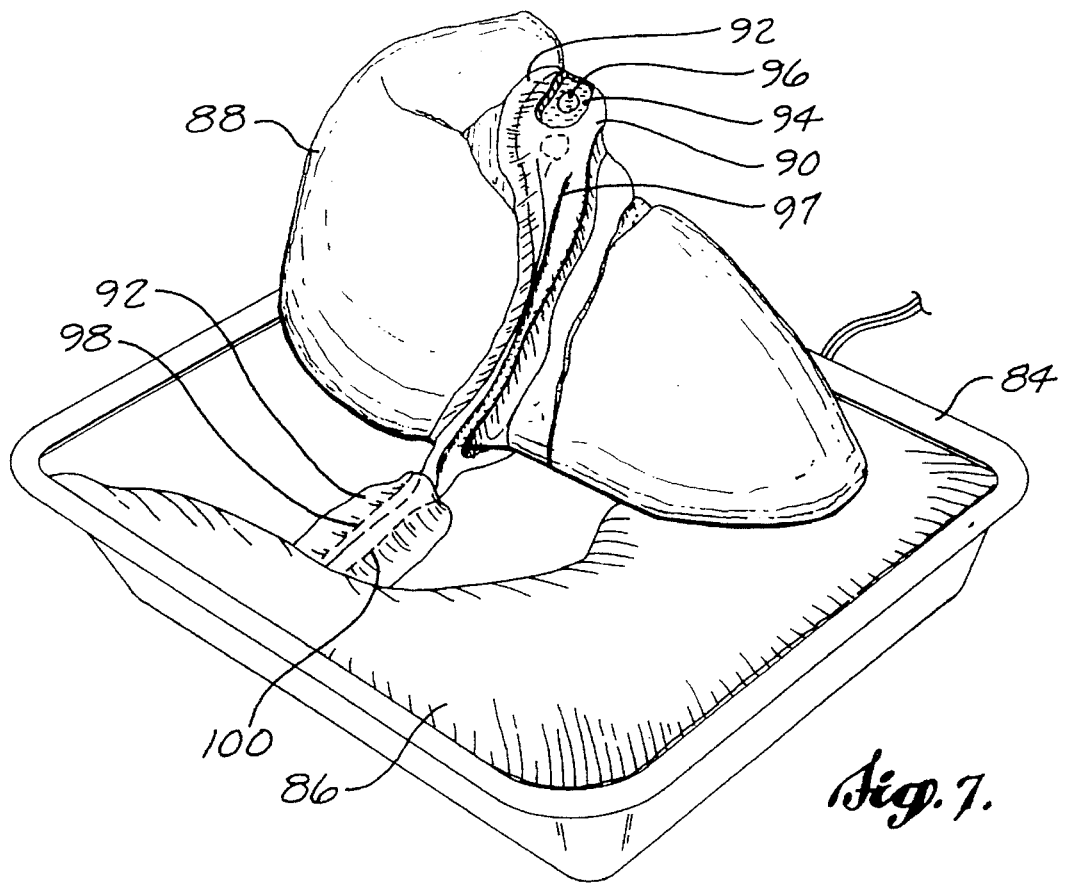
FIG. 7 provides a pictorial view of the procedure pack of FIG. 6, with the simulated liver lifted upwardly to expose the gall bladder and common bile duct.

Attention is now directed to FIGS. 6 and 7 for a description of an additional procedure pack, the laparoscopic cholecystectomy procedure pack 82. This procedure pack is useful for laparoscopic common bile duct exploration and cholecystectomy and removal of gall stones. The procedure pack 82 includes a tray 84 in which is formed a foam elastomer liner 86 that is contoured to match the contour of the stomach. A synthetic liver 88 formed of the simulated organ tissue (to be described in greater detail subsequently) is fitted within the tray 84, and sealed to one edge of the tray 84 so that it overlies the liner 86. The shape, contour and tactile response of the liver 88 is substantially equivalent to that of a real liver 88.

A synthetic gallbladder 90 underlies the liver 88, as shown in FIG. 7. The gallbladder 90 is covered with a thin irregular sheet of synthetic connective tissue 92 that also serves to join the gallbladder 90 to the liver 88. The connective tissue 92 is formulated in accordance with the present invention, as shall be described subsequently. The gallbladder 90 is realistically contoured and is formed from a hollow, contoured molding of simulated organ tissue. The interior of the gallbladder 90 is pressurized with a synthetic bile fluid, such as thickened water that has been dyed yellow. Cutting open the gallbladder 90 during surgical training results in the bile fluid exuding from the gallbladder 90. Because the bile fluid 94 is under static pressure, it does not flow continuously after incision of the gallbladder 90. The gallbladder 90 also includes one or more synthetic gall stones 96. The gall stones are made of rigid materials such as an epoxy or urethane plastic. The synthetic gall stones 96 may be filled with quartz sand or other material that will show up on x-rays to enable trainees to use x-rays to guide them in the surgical training. The gall stones 96 may also be filled with bone meal to simulate calcium deposits.

The exterior of the gallbladder 90 is provided with simulated cystic arteries 97 that are made of a pressurized latex tube that is adhered to the outside of the gallbladder 90 by the connective tissue 92. The formed stomach liner 86 is formed from a resilient material, such as a urethane foam. The gallbladder 92 extends into an elongate common bile duct segment that extends from the liver 88 and is received within a channel 98 formed in the liner 86. This extended section of the gallbladder 90 simulates a common bile duct 100, which is sealed within the channel 98 by additional synthetic connective tissue 92.

As shall be described subsequently, the liver 88 is formed from a conductive organ composition that is electrocauterizable. An electrode patch 102 (FIG. 6) is secured to the underside of the liver 88 by a conductive adhesive. The electrode patch 102 is connected to an electrode lead 104 that is fed through an aperture in the tray 84 and terminates in a connector plug 106. The electrode patch 102 serves as the return anode that would typically be placed underneath the patient's back during electrocauterization. This enables trainees to use electrocautery scalpels to dissect the liver 88 and gallbladder 90. In some instances the electrode patch 102 may be too remote from certain regions of the liver 88 that are desired to be dissected. In that instance, connective wires may be fed from the electrode patch 102 to remote regions of the anatomic structure, or conductive connective tissue 92 may be employed to extend a conductive path from the electrode patch 102 to the remote end of the gallbladder 90.

The procedure pack 82 allows for training in laparoscopic common bile duct exploration. Because the tray 84 will contain fluid, surgeons may practice irrigation of the bile duct 100, as well as cannulation and balloon dilation of the duct. Choleoscopy and utilization of stone removal instrumentation may be employed on the gallbladder 90. The gallbladder 90 can be dissected from the liver 88, and the bile duct 100 can be dissected free, without damaging these structures or the structures to which they are attached, by severing the connective tissue 92. The density of the liver 88 and gallbladder 90 materials are selected such that lifting and manipulating these anatomic structures provides the same tactile feedback and requires the same forces as are employed during surgery on actual anatomic structure. Likewise, the forces required and tactile feedback resulting during incision and dissection of this anatomic structure is equivalent to that experienced during surgery on actual anatomic structure.

FIG. 8 illustrates another variant of a procedure pack 20. In particular, FIG. 8 illustrates an upper gastro-intestinal tract procedure pack 102, which is substantially similar to the procedure pack 30 illustrated in FIG. 2. The procedure pack 102 includes a synthetic esophagus 104 that passes through a synthetic diaphragm 106 and extends through an aperture (not shown) in the tray 108 that holds the simulator pack. As previously discussed, the esophagus can be extended through the torso 12 through an aperture 40 (FIG. 2) to enable insertion of a bougie during surgical procedures. The esophagus 104 extends to a simulated stomach 110 that is joined by synthetic connective tissue 112 to a synthetic abdominal membrane 114 that lines the tray 108 and that is attached to the synthetic diaphragm 106. The procedure pack 102 also includes a synthetic spleen 116, formed from a soft tissue formulation to be described below, that is secured to both the stomach 110 and the membrane 114 by additional connective tissue 112. Simulated short gastric arteries 118 are also joined to the stomach 110 by additional connective tissue 112.

The gastric arteries 118 wrap between the stomach 110 and spleen 116, and terminate underneath the membrane 114 where they are connected to a fluid inlet tube 120 and outlet tube 122. The fluid inlet 120 and outlet 122 tubes pass through the tray 108 for connection to a pump 44 as previously described. These permit supplying the arteries 118 with synthetic blood fluid to enable realistic arterial incision, bleeding, clamping and suturing in the same manner as previously described for other procedure packs. An electrode lead 124 is electrically connected to an electrode patch (shown only in FIG. 2) that is electrically secured to the stomach 110.

The simulator pack 102 allows practice of a Nissen fundoplication. The procedure, which is well known to those of ordinary skill in the surgical arts, involves insertion of a bougie into the esophagus. Using endoscopic instruments the spleen 116 is disconnected from the gastric arteries by dissecting the connective tissue 112. This is possible to do without damaging either the spleen 116 or the arteries 118 due to the physical properties of the connective tissue 112. However if the arteries 118 are damaged the simulated blood fluid from inlet 120 will flow from the incision until sutured or clamped. The Nissen or fundus of the stomach is then disconnected from the spleen 116 and membrane 114 by dissecting the corresponding portion of the connective tissue 112. The esophagus 104 is dissected from the diaphragm 106, and the free length of the esophagus is increased. The diaphragm 106 can then be sutured to the esophagus 104 to secure this new position. The fundus of the stomach 110 is then grasped, wrapped around the esophagus 104, and sutured to itself. All of the manipulation, dissection and suturing steps are realistic in the mechanical feedback provided to the surgeon trainee.

Attention is now directed to FIGS. 9 and 10 which disclose a prostrate simulator system 126. The prostrate simulator system 126 can be integrated into the torso 12, but as illustrated, is a stand alone system that includes some features in common with those procedure packs previously described. The prostrate simulator 126 includes a penile fixture 128 that is formed from a dense elastomer such as silicone rubber. The penile fixture 128 includes a base 130, a frustoconical body portion 132 that is centered above the base 130, and a cylindrical penile portion 134 that projects outwardly from the body portion 132. A cylindrical cavity 136 is formed within the body portion 132 and is aligned on the longitudinal axis of the body portion 132 and penile portion 134. A passage 138 extends from the distal tip of the penile portion 134 back to the cavity 136.

The cavity 136 receives a disposable prostrate cartridge 140. The prostrate cartridge 140 includes a tubular casing 142, which is suitably formed from a semi-rigid material such as polyethylene. A synthetic prostrate gland 144 is cast in place within the casing 142. The synthetic prostrate gland 144 is cast from a soft tissue formulation that shall be described subsequently, and is formed to include prostrate nodules 146 that project inwardly into a central passage 148 formed through the center of the cartridge 140. Endoscopic instruments can be inserted through the passage 138 of the penile portion 134 into the prostrate cartridge 140 to allow surgery on the simulated prostrate 144 by removal of the nodules 146. Thus the simulator 126 enables training and practice in videoendoscopic prostatectomies.

A synthetic bladder 150, formed from a hollow latex pouch, can be secured by a retainer ring 152 to the end of the prostrate cartridge 140 projecting outwardly from the penile fixture. A catheter tube 154 projects through the bladder wall to enable drainage of irrigation solution from the bladder during prostrate surgery training. This also enables surgery on tumors (not shown) that may be formed on the inside lining of the bladder 150.

C. Elastomer Formulations

The various above described procedure packs and simulated anatomical structures include structure that is formed from elastomeric formulations which shall now be described. The tissue formulations are made with natural ingredients to yield non-toxic formulations. The following compositions are useful for forming various anatomic structures in accordance with the present invention by molding the wet liquid, gelled or paste compositions to produce dried elastomers of the desired configuration. Before utilizing any of the procedure packs disclosed above, it is preferred to spray the procedure pack with a saline solution, suitably including 10% sodium chloride in water, over the surface of the anatomic structures. This provides a more accurate visual impression through the endoscopic video camera, aids suturing, and aids conductivity for electrocauterization.

i. Organ Tissue Formulation

The first such formulation is that which is used to form organs such as the liver, gall bladder, arteries, bile ducts, stomach and esophagus disclosed above, as well as other organs not specifically described such as intestines. The composition includes a liquid natural water based latex that is altered to reduce its stiffness and strength. One suitable source of supply for a natural water based latex is Seattle Pottery, Seattle, Wash. This natural water based latex is thinned with distilled water and mixed to a smooth consistency. The amount of water added is dependent on the desired strength and flexibility of the organ being simulated. The ratio of added water to the water based latex ranges from 1:100 to 20:100 by volume. For example, a preferred formulation for a synthetic gall bladder or liver is made from mixing 10 parts water to 100 parts of liquid natural water based latex prior to curing. It is also desirable to add a suitable coloring agent to better simulate the visual appearance of the organs. Suitable coloring agents include Liquitex Brand artists acrylic enamel, available from Binney & Smyth, Inc., Easton, Pa.

If it is desired that the simulated organs be electrocauterizable, it is also preferred to add a conductive agent to the organ formulation. Suitable conductive agents include powered or flaked stainless steel and copper or other conductive metals. A minimum of one gram of powered metal is added per liquid ounce, i.e., 1 gram per 30 ml., of thinned liquid latex composition. The amount of metal to be added can be readily determined by one of ordinary skill in the art depending on the size of the organ and the distance over which electrical current must be carded through the organ during electrocauterization. Typically from 1.0 to 5.0 grams of metal powder per 30 ml. of thinned liquid latex is added. To aid in suspension of the metal powder, it is also desired to add an emulsifier to the organ formulation. A suitable emulsifier is liquid soya lecithin, which is added at a level of 10% by volume of the thinned liquid latex composition.

ii. Connective Tissue Formulation

The connective tissue formulation used for joining various anatomic structure together will now be described with reference to Table I. This composition is brushed or spread onto anatomic structures to be joined. The composition is a combination of an elastomeric polymer and a gel base solution that is combined with the elastomeric polymer to reduce the polymer tear strength and extent of maximum elongation.

to prepare a solution ranging from 1 gram of carboxymethyl cellulose per 50 ml. of water to 1 gram per 1,000 ml. of water. The most preferred formulation includes 1 gram of carboxymethyl cellulose per 250 ml. of water. The amount of water included has a direct impact on the reduction in tear strength of the resulting dried connective tissue.

Other gelling agents are also theorized to be suitable for the present invention, including gelatin, pectin and alginate. However, these agents are not preferred because they tend to melt rather than burning and evaporating during electrocauterization. Additionally, it is found that the sodium salt of carboxymethyl cellulose, the preferred gelling agent, aids in imparting electrical conductivity to the connective tissue formulation.

In addition to the carboxymethyl cellulose and water, an emulsifier is preferably added to the gel base solution. The

TABLE I

Connective Tissue Composition

| Ingredient | Preferred Agent | Content Range | Preferred Content |
| --- | --- | --- | --- |
| A. Base Solution | | | |
| 1. Gelling Agent in Solvent | Carboxymethyl Cellulose Solution in water (Carbox. Cell.) | 1.0 gram Carbox. Cell./50–1,000 ml. H$_2$O | 1.0 gram/250 ml. |
| 2. Emulsifier | Liquid Soya Lecithin | 1:1–3:10 Carbox. Cell. Soln.:Lecithin (volume ratio) | 2:1 |
| B. Elastomeric Polymer | Nat. Latex (water based solution) | 1:1–1:10 Base Soln.:Latex (volume ratio) | 1:1–1:10 |
| C. Conductive Agent (optional) | Copper or Stainless Steel Flakes | minimum 1.0 gram conductive agent per liquid oz. (30 ml.) of combined Base Soln. plus latex | 1.0–5.0 grams/30 ml. |
| D. Coloring Agent (optional) | Acrylic Enamel | Visual determination | |
| E. Preservative (optional) | Potassium Sorbate | Trace | |

The preferred elastomeric polymer is a natural water based latex that is well known in the arts of mold making, impression making and theater arts. This solution, which consists of natural latex suspended in water, is the same as that disclosed above for use in making the organ tissue formulation.

Preferably this gel base solution is added in sufficient quantity to reduce the tear strength and maximum extent of elongation of the polymer when cured by at least 50%, and preferably by 75% of its original values. The base solution also serves to extend the elastomer, and to give a spongy texture. When formulated for electrocauterization, the base solution aids in rendering the composition conductive, and minimizes smoke and burning odor upon electrocauterization. The ingredients of the base solution tend to burn or evaporate rather than melt during electrocauterization. The formulation is also laserable.

The base solution includes a gelling agent and solvent. The most preferred gelling agent is the sodium salt of carboxymethyl cellulose. Preferably a high molecular weight, high viscosity carboxymethyl cellulose is utilized. A suitable carboxymethyl cellulose is available from Aldrich Chemical Co., Inc., Milwaukee, Wis., catalog number 41,933.8, and has an average molecular weight of about 700,000. The carboxymethyl cellulose is dissolved in water use of carboxymethyl cellulose as the gelling agent yields a formulation that is electrically conductive and suitable for electrocauterization if the simulator procedure pack produced from the formulation is used while freshly made, i.e., within one week of manufacture. However if this product is to be stored for a period of time prior to use, it is desired to add a conductive agent, as shall be described subsequently. In order to aid in suspension of the conductive agent, it is preferred to add an emulsifier, such as liquid soya lecithin, to the aqueous solution of carboxymethyl cellulose to complete the gel base solution. The liquid soya lecithin is mixed with the carboxymethyl cellulose solution in a ratio of from between 1 and 3 parts of carboxymethyl cellulose solution to 1 part liquid soya lecithin, by volume. Preferably 2 parts of carboxymethyl cellulose are mixed with one part of liquid soya lecithin.

This gel base solution, consisting of carboxymethyl cellulose, water and lecithin, is then combined with the natural water based latex in a ratio of 1 part gel base solution to from 1 to 10 parts water based latex by volume. This ratio is adjusted to obtain the desired tear strength of the connective tissue formed.

If the connective tissue is desired to be electrically cauterizable and is not to be used immediately, as discussed above, it is preferred to add a conductive metal powder to the solution. Preferably at least 1 gram of a flaked stainless steel or copper are added per ounce, i.e., per 30 ml., of the combined gel base solution and latex. The addition of from 1 to 5 grams per 30 ml. of combined solution is suitable, with preferably 1 to 2 grams being utilized.

A coloring agent is then added to provide the proper visual appearance of the tissue. Suitable coloring agents include the acrylic enamels discussed above. A preservative may be utilized to preserve the composition if it is to be stored for a long period. Suitable preservatives are potassium sorbate or lemon juice, which is added at a trace level.

iii. Soft Tissue Formulation

A third formulation is used for simulated soft tissues, such as spinal discs, meniscus and the spleen and prostate gland disclosed above. The ingredients of the soft tissue composition are disclosed in the following Table II.

TABLE II

| Soft Tissue Composition | | | |
|---|---|---|---|
| Ingredient | Preferred Agent | Content Range | Preferred Content |
| A. Gelling Agent | Powered Alginate in water | 1:1–100:1 water:alginate (volume ratio) | 1:1–3:1 |
| B. Base Solution (per Table I above) | | | |
| C. Further processing | | | |
| 1. Mix alginate solution:Base solution | | 10:1–1:10 (volume ratio) | |
| 2. Add fiber reinforcement | Cotton/Rayon fibers | 5–15% by volume | 10% |
| C. Conductive Agent (optional) | Copper or Stainless Steel Flakes | minimum 1.0 gram conductive agent per liquid oz. (30 ml.) combined base soln. plus latex | 1.0–5.0 grams/30 ml. |
| E. Coloring agent (optional) | Acrylic Enamel | Visual determination | |
| F. Preservative (optional) | Potassium Sorbate | Trace | |

The soft tissue formulation utilizes a gelling agent in a solvent. A preferred gelling agent is a powdered alginate that is dissolved in water. The term alginate is intended to encompass both salts of native alginate and derivatives thereof. A suitable alginate is an alginate dental impression material available from Cadco Dental Products under the brand name Identic. This alginate is solubilized in water at a ratio of 1 part alginate in from 1 to 100 parts water, by volume. A preferred formulation includes 1 part alginate per 3 parts of water to produce soft tissues having a high degree of body, such as the spleen discussed above. For soft tissues that have less body, such as a spinal disc or the prostrate gland disclosed above, a preferred ratio is 1 part water to 1 part alginate. A suitable coloring agent as disclosed earlier is then admixed to provide the correct visual appearance. To produce a prostrate gland, this 1:1 mixture of powdered alginate and water plus coloring agent alone is used.

If forming a simulated spleen or other soft tissue having greater body, the alginate formulation produced by mixing 3 parts water to 1 part alginate is combined with the gel base solution disclosed above in Table 1 for use in connective tissue. This gel base solution includes carboxymethyl cellulose, soya lecithin and natural latex. The alginate formulation is mixed with the gel base solution in a ratio of from 10:1 to 1:10 by volume. A preferred ratio is 1:1.

In producing a spinal disc or meniscus, a fibrous material is preferably added to the 1:1 alginate formulation to provide the proper texture and strength if the material is to be laser cut. A suitable fiber is a cotton/rayon fiber that is added to the alginate solution in an amount of 5 to 15% by volume, and preferably 10%. The fiber is useful if it is desired to perform laser surgery training on the spinal disc, but otherwise may be omitted. As an alternative to this formulation, a laserable formulation can also be produced by mixing the alginate formulation in a ratio of 3 parts alginate to 1 part water by volume. For every 4 liquid ounces of this alginate formulation, 1 gram of a white acrylic paint is added to produce a consistency that is realistically "chunked" by laser.

In any of these formulations for soft tissue, if it is desired to do electrocauterization, a powdered metal is added as previously described for the connective tissue composition. The formulation is also laserable While the above invention has been disclosed in terms of particular organs and procedure packs, it should be readily apparent to one of ordinary skill in the art that the formulations and techniques disclosed above could be adopted for various anatomic structures and procedures. It will also be appreciated that various other changes can be made to the disclosed embodiments of the present invention without departing from the spirit and scope of the invention. It is thus intended that the scope of letters patent granted hereon be limited only by the definitions of the appended claims The embodiments of the invention in which an exclusive property or privilege is claimed are defined as follows:

1. An anatomical simulator for surgical training, comprising:

a plurality of synthetic anatomical structures;

and a resilient synthetic connective tissue bonding the synthetic anatomical structures together and defining a synthetic tissue plane having a predetermined thickness and tear strength, the connective tissue being incisable to permit dissection of the anatomical structures while maintaining the integrity of individual dissected anatomical structures.

2. The anatomical simulator of claim 1, wherein the anatomical structures are formed from a resilient elastomeric material selected to provide tactile feedback through a hand-held endoscopic instrument when the anatomical simulator is used for videoendoscopic surgical training equivalent to that experienced during performance of a surgical procedure on a corresponding mammalian anatomical structure.

3. The anatomical simulator of claim 2, where at least one of the synthetic anatomical structures and resilient synthetic connective tissue is capable of being dissected by a laser.

4. The anatomical simulator of claim 2, wherein at least one of the synthetic anatomical structures and connective tissue is formed from an electrically conductive elastomer that is electrocauterizable, further comprising an electrode lead secured in electrical contact with the synthetic anatomical structure or connective tissue to serve as the anode during electrocauterization.

5. The anatomical simulator of claim 4, wherein the conductive elastomer is filled with a powdered metal.

6. The anatomical simulator of claim 2, wherein at least one of the synthetic anatomical structures is suturable through the use of endoscopic suturing instruments employed with force equivalent to a force required to suture a corresponding mammalian anatomical structure.

7. The anatomical simulator of claim 1, wherein the resilient synthetic connective tissue is made from an elastomer having a maximum elongation and tear strength equivalent to that of a corresponding mammalian connective tissue.

8. The anatomical simulator of claim 1, wherein the synthetic anatomical structures include a vessel having a resilient wall, further comprising a synthetic bodily fluid contained within the vessel, the fluid being pressurized so that it exudes from the vessel if the vessel wall is cut during surgical training.

9. The anatomical simulator of claim 8, wherein the fluid within the vessel is maintained at a static pressure that is relieved immediately upon cutting through the vessel wall.

10. The anatomical simulator of claim 8, further comprising:
a fluid reservoir containing the synthetic bodily fluid that is connected in fluid flow communication with the vessel; and
a pump connected in fluid flow connection with the fluid reservoir for supplying a continuous flow of fluid from the fluid reservoir to the vessel for a finite period of time following cutting the wall of the vessel to simulate blood flow.

11. The anatomical simulator of claim 10, wherein the vessel defines both an inlet port and an outlet port, both the inlet port and outlet port being in fluid flow communication with the fluid reservoir, so that fluid is continuously circulated by the pump from the fluid reservoir through the vessel and back to the fluid reservoir during surgical training.

12. The anatomical simulator of claim 11, further comprising an orifice valve connected in fluid flow communication with the inlet or outlet port of the vessel to regulate the flow rate of fluid through the vessel.

13. The anatomical simulator of claim 12, wherein the orifice valve is connected between the outlet port of the vessel and the fluid reservoir, so that flow of fluid through the vessel is restricted to a first flow rate until such time that the vessel wall is cut, after which fluid is able to flow into the vessel from the fluid reservoir at a second flow rate that is greater than the first flow rate, exiting the vessel through the outlet port and a cut portion of the vessel wall.

14. The anatomical simulator of claim 1, wherein the synthetic connective tissue is formed form an elastomeric composition comprising:
a liquid elastomer base that is curable to form a resilient elastomer; and
a gelling agent that is miscible with the liquid elastomer base, wherein the gelling agent is admixed with the liquid elastomer base in a quantity sufficient to reduce the tear strength and maximum elongation of the cured resilient elastomer by at least 50% to mimic the elongation and the strength of corresponding mammalian anatomical connective tissue that joins mammalian anatomical structures.

15. The anatomical simulator of claim 14, wherein the liquid elastomer base comprises a water based natural latex rubber.

16. The anatomical simulator of claim 15, wherein the gelling agent comprises the sodium salt of carboxymethyl cellulose.

17. The anatomical simulator of claim 16, wherein the elastomeric composition further comprises liquid soya lecithin as an emulsifier, admixed with the sodium salt of carboxymethyl cellulose and water at a ratio of from 250 ml. liquid soya lecithin per 1.0 gram of the sodium salt of carboxymethyl cellulose to 250 ml. liquid soya lecithin per 3.0 grams of the sodium salt of carboxymethyl cellulose.

18. The anatomical simulator of claim 14, wherein the elastomeric composition comprises sufficient gelling agent to reduce the tear strength and maximum elongation of the cured resilient elastomer by at least 75%.

19. The anatomical simulator of claim 1, wherein the synthetic anatomical structure includes a synthetic liver and a synthetic gallbladder interconnected by the synthetic connective tissue.

20. The anatomical simulator of claim 19, wherein the synthetic gallbladder is pressurized with a synthetic bile fluid.

21. The anatomical simulator of claim 19, further comprising rigid synthetic gallstones contained within the synthetic gallbladder.

22. The anatomical simulator of claim 19, further comprising a synthetic tissue base defining a channel, wherein the synthetic gallbladder extends into a synthetic common bile duct that is received within the channel and joined thereto by the synthetic connective tissue.

23. The anatomical simulator of claim 1, wherein the anatomical structure comprises a synthetic stomach, a synthetic esophagus and a synthetic spleen.

24. The anatomical simulator of claim 23, wherein the esophagus extends to form an aperture capable of receiving a bougie.

25. The anatomical simulator of claim 1, wherein the synthetic anatomical structures comprise a formed elastomeric body defining a plurality of channels configured to be suturable with videoendoscopic suturing instruments.

26. The anatomical simulator of claim 25, wherein the formed elastomeric body is formed from a composition comprising a urethane elastomer foam and a sufficient quantity of petroleum jelly to yield a thin skin.

27. The anatomical simulator of claim 25, wherein the formed elastomeric body defines a channel that receives a flexible synthetic blood vessel that is sealed within the channel by the synthetic connective tissue, wherein the synthetic blood vessel is pressurized with a synthetic blood fluid.

28. An anatomical simulator for videoendoscopic surgical training, comprising:

a synthetic anatomical structure formed from an electrically conductive elastomer that is electrocauterizable; and an electrode lead secured in electrical contact with the anatomical structure to serve as the anode during electrocauterization of the anatomical structure.

29. The anatomical simulator of claim 28, wherein the electrically conductive elastomer is filled with a powdered metal.

30. An anatomical simulator for videoendoscopic surgical training, comprising:

a housing in the form of at least a portion of a torso;

a synthetic anatomical structure in the form of an internal bodily organ mounted within the housing including a vessel having a resilient wall; and a synthetic bodily fluid contained within the vessel, wherein the fluid is pressurized so that it exudes from the vessel if the vessel wall is cut during surgical training.

31. The anatomical simulator of claim 30, wherein the fluid within the vessel is maintained at a static pressure that is relieved immediately upon cutting the vessel wall.

32. The anatomical simulator of claim 30, further comprising:

a fluid reservoir containing the synthetic bodily fluid that is connected in fluid flow communication with the vessel; and a pump connected in fluid flow connection with the fluid reservoir for supplying a continuous flow of fluid from the fluid reservoir to the vessel for a finite period of time following cutting the wall of the vessel to simulate blood flow.

33. The anatomical simulator of claim 32, wherein the vessel defines both an inlet port and an outlet port, both the inlet port and outlet port being in fluid flow communication with the fluid reservoir, so that fluid is continuously circulated by the pump from the fluid reservoir through the vessel and back to the fluid reservoir during surgical training.

34. The anatomical simulator of claim 33, further comprising an orifice valve connected in fluid flow communication with the inlet or outlet port of the vessel to regulate the flow rate of fluid through the vessel.

35. The anatomical simulator of claim 34, wherein the orifice valve is connected between the outlet port of the vessel and the fluid reservoir, so that flow of fluid through the vessel is restricted to a first flow rate until such time that the vessel wall is cut, after which fluid is able to flow into the vessel from the fluid reservoir at a second flow rate that is greater than the first flow rate, exiting the vessel through the outlet port and a cut portion of the vessel wall.

36. An elastomeric composition for use in forming an anatomical simulator for surgical training, comprising:

a liquid elastomer base that is curable to form a resilient elastomer; and a gelling agent that is miscible with the liquid elastomer base, wherein the gelling agent is admixed with the liquid elastomer base in a quantity sufficient to reduce the tear strength and maximum elongation of the cured resilient elastomer by at least 50% to mimic the elongation and tear strength of anatomical connective tissue that joins anatomical structures.

37. The elastomeric composition of claim 36, wherein the liquid elastomer base comprises a water based natural latex rubber.

38. The elastomeric composition of claim 37, wherein the gelling agent comprises the sodium salt of carboxymethyl cellulose.

39. The elastomeric composition of claim 38, wherein the sodium salt of carboxymethyl cellulose is included at a ratio of from 1 gram:2,500 ml. of water based latex to 1 gram:250 ml. of water based latex.

40. The elastomeric composition of claim 36, further comprising the addition of a sufficient quantity of electrically conductive metal particles to render the composition electrocauterizable.

41. The elastomeric composition of claim 40, further comprising the addition of at least one gram of conductive metal particles per 30 ml. of liquid elastomer base.

42. The elastomeric composition of claim 38, further comprising liquid soya lecithin as an emulsifier, admixed with the sodium salt of carboxymethyl cellulose in water at a ratio of from 250 ml. liquid soya lecithin per 1.0 gram of the sodium salt of carboxymethyl cellulose to 250 ml. liquid soya lecithin per 3.0 grams of the sodium salt of carboxymethyl cellulose.

43. An anatomical torso simulator for videoendoscopic training using hand-held endoscopic instruments insertable through trocars, the torso comprising:

a synthetic torso base including a pneumoperitoneum wall defining a plurality of apertures, each aperture sized to receive a trocar, wherein an annular elastomeric mount is formed in the pneumoperitoneum wall about each aperture to permit a trocar inserted within the aperture to be manually pivoted about the aperture in all directions by 45° relative to a longitudinal axis defined by the trocar when the trocar is at rest within the aperture, the elastomeric mounts having a predetermined diameter and thickness such that the manual force required to tilt each trocar is equivalent to the manual force required to deflect a trocar inserted within a live patient's inflated peritoneal cavity, wherein the predetermined thickness of the elastomeric mounts is reduced relative to the thickness of the pneumoperitoneum wall.

\* \* \* \* \*

UNITED STATES PATENT AND TRADEMARK OFFICE
CERTIFICATE OF CORRECTION

PATENT NO. : 5,620,326  
DATED : April 15, 1997  
INVENTOR(S) : S.B. Younker

Page 1 of 2

It is certified that error appears in the above-indentified patent and that said Letters Patent is hereby corrected as shown below:

COLUMN     LINE

Title Page, Item

[56]    Refs. Cited    Insert the following references:  
Pg. 1, col. 1    (Other    --Limbs & Things Ltd. Brochure, 3/1/96, including flyers  
              Publs.)    Cannulation Pads, 11/95  
                             *Product News* Newsletter, 11/95  
                             Amnio/Cordocentesis, 3/95  
                             Shoulder Trainer, 8/95  
                             Hysteroscopic Trainer, 11/95  
                             Pelvic Trainer, 3/93  
                             Hysteroscopy, 6/94  
                             Simulated Bowel  
                             Male Pelvic Trainer  
                             Clinical Female Pelvic Trainer, 11/95  
                             Body Form--

[56]    Refs. Cited    Insert the following references:  
Pg. 1, col. 1    (Foreign    --WO 93/16664    09/02/1993    PCT  
              Pat. Docs.)    WO 93/14483      07/22/1993    PCT  
                             GB 2 277 826 B    09/11/1994    U.K.  
                             WO 94/25948      11/10/1994    PCT--

UNITED STATES PATENT AND TRADEMARK OFFICE
CERTIFICATE OF CORRECTION

PATENT NO. : 5,620,326
DATED : April 15, 1997
INVENTOR(S) : S.B. Younker

It is certified that error appears in the above-indentified patent and that said Letters Patent is hereby corrected as shown below:

| COLUMN | LINE | |
|---|---|---|
| 18 (Claim 42, | 33-34 lines 6-7) | "carboxym-ethyl" should be hyphenated as --carboxy-methyl-- |

Signed and Sealed this

Eighth Day of July, 1997

Attest:

Attesting Officer

BRUCE LEHMAN

Commissioner of Patents and Trademarks